(12) United States Patent
Lavi et al.

(10) Patent No.: US 8,873,448 B2
(45) Date of Patent: Oct. 28, 2014

(54) METHOD FOR BROADCASTING/MULTICASTING TRANSMISSIONS IN WIRELESS NETWORKS

(75) Inventors: Nadav Lavi, Rishon-LeZion (IL); Leonid Shousterman, Alfei Menashe (IL)

(73) Assignee: Sparkmotion Inc., Ottawa, Ontario (CA)

( * ) Notice: Subject to any disclaimer, the term of this patent is extended or adjusted under 35 U.S.C. 154(b) by 675 days.

(21) Appl. No.: 12/921,084

(22) PCT Filed: Mar. 2, 2009

(86) PCT No.: PCT/IL2009/000238
§ 371 (c)(1),
(2), (4) Date: Sep. 3, 2010

(87) PCT Pub. No.: WO2009/109964
PCT Pub. Date: Sep. 11, 2009

(65) Prior Publication Data
US 2011/0149825 A1    Jun. 23, 2011

(30) Foreign Application Priority Data

Mar. 3, 2008   (IL) .......................................... 189891

(51) Int. Cl.
*H04W 4/06* (2009.01)
*H04W 36/00* (2009.01)
*H04W 72/00* (2009.01)

(52) U.S. Cl.
CPC ........ *H04W 36/0072* (2013.01); *H04W 72/005* (2013.01)
USPC ....................................................... 370/312

(58) Field of Classification Search
None
See application file for complete search history.

(56) References Cited

U.S. PATENT DOCUMENTS

| 2003/0100325 A1 | 5/2003 | Paila et al. |
| 2005/0272443 A1 * | 12/2005 | Hose et al. ................. 455/456.1 |
| 2007/0253360 A1 * | 11/2007 | Jalil et al. ....................... 370/328 |

(Continued)

FOREIGN PATENT DOCUMENTS

WO   2006011763 A2   2/2006

OTHER PUBLICATIONS

Koo, Changhoi et al., "Comments on IEEE 802.16e Handoff Draft", IEEE 802.16 Broadband Wireless Access Working Group, pp. 0-33, Mar. 11, 2003.

(Continued)

*Primary Examiner* — Hassan Phillips
*Assistant Examiner* — Gautam Sharma
(74) *Attorney, Agent, or Firm* — Procopio, Cory, Hargreaves & Savitch LLP

(57) ABSTRACT

In a wireless communications network comprising a plurality of multicast and broadcast service (MBS) zones each of which comprises at least one base station, there is provided a method for providing a multicast and broadcast service to a mobile terminal capable of moving from one MBS zone to another. The method comprises the steps of: providing the mobile terminal with one or more multicasting/broadcasting transmissions comprising at least one multicast connection identification (MCID) associated with an MBS zone other than a current MBS zone at which the mobile terminal is currently receiving the one or more multicasting/broadcasting transmissions; retrieving information regarding the at least one MCID; and upon detecting that the mobile terminal is capable of receiving transmissions associated with the other MBS_ZONE, utilizing the MCID associated with that other MBS_ZONE to receive multicasting/broadcasting transmissions intended for that mobile terminal.

26 Claims, 3 Drawing Sheets

(56) References Cited

U.S. PATENT DOCUMENTS

| | | |
|---|---|---|
| 2008/0037460 A1 | 2/2008 | Venkatachalam |
| 2008/0037472 A1* | 2/2008 | Ryu et al. .................. 370/332 |
| 2008/0267104 A1* | 10/2008 | Zhang ....................... 370/311 |
| 2009/0103466 A1* | 4/2009 | Gu et al. .................... 370/312 |
| 2009/0109890 A1* | 4/2009 | Chow et al. ................ 370/312 |
| 2009/0154386 A1* | 6/2009 | So et al. .................... 370/311 |

OTHER PUBLICATIONS

Lee, Ji Hoon et al., "Location Management Area (LMA)-based MBS Handover in Mobile WiMAX Systems", Communication Systems Software and Middleware and Workshops, IEEE, pp. 341-348, Jan. 6, 2008.

* cited by examiner

METHOD FOR BROADCASTING/MULTICASTING TRANSMISSIONS IN WIRELESS NETWORKS

FIELD OF THE INVENTION

The present invention relates to method and apparatus adapted to improve transmission efficiency in wireless communications systems, and more particularly in wireless communications networks that support multicast/broadcast services.

BACKGROUND OF THE INVENTION

Multicast/Broadcast Service ("MBS") in WiMAX Networks is a service that allows the distribution of data to a group of Mobile Subscribers ("MSs"). IEEE 802.16e standard introduces the notion of MBS_ZONE—aggregation of multiple Base Stations ("BSs") wherein an MBS SF ("Service Flow") having a certain SFID (Service Flow Identification) is mapped onto the same Connection Identifier ("CID") (although in some applications this is done only when there is an identical communication to transmit). In other words, the term "MBS_ZONE" does not typically relate to an area as the same Base Station may belong to more than one MBS_ZONE. Instead, it relates to the mapping of MBS SFIDs onto certain CIDs to enable synchronous broadcast of the same data over the same subchannels at the same time. This technique greatly improves the mobile terminals ability to receive data correctly due to increased energy of the combined signal that each mobile terminal received simultaneously from multiple Base Stations.

MBS Service-Flow ("SF") carries information to a set of MSs. Typically there are two methods to access a group of MSs for the provisioning of MBS:

Single-BS: Transmission of data over a single Base Station ("BS") in the network. The SF is mapped to a Connection Identifier ("CID") within a specific BS, i.e., the CID is uniquely specified on a "per BS basis".

Multi-BS: Transmission of data over a plurality of BSs in the network in a synchronized manner. The SF is mapped to a CID unique within a zone at which the service is provided, referred to hereinafter as an "MBS_ZONE".

The establishment of an MBS connection is typically carried out in a way similar to the way by which unicast connections are established, while the MS registers to the network.

Upon completion of the network entry ("NWE"), the MS is provided with the relevant Multicasting Connection Identifiers ("MCIDs") and/or with the relevant Logical Channels Identifiers ("LCID"), enabling it to receive the MBS, and this service, is maintained regardless of the current mode of the MS (Normal/Sleep/Idle), so that MBS data is transmitted and received regardless of the MS current operation mode.

The Multi-BS access method enables an MS to receive the MBS content, after having successfully registered and the connection established, from several BSs. As explained above, this transmission method requires that the group of BSs participating in the same Multi-BS-MBS service to be synchronized so that data shall be transmitted by all these BSs simultaneously, and to use the same CID and Security Association ("SA"). It should be noted that the MS does not have to be registered at the specific BS from which it receives MBS transmissions.

As was mentioned hereinbefore, an MBS_ZONE identifier is used to indicate the group of BSs which use the same CID and SA to distribute an MBS SF. MBS_ZONE can be advertised by the BS in DCD messages, also it can be delivered upon establishment of MBS connection and it can be extracted from the MAP_MBS_IE.

Logical Channels are used to distinguish between logical MBS connection for each MBS content delivered within the multicast connection. When used, every MBS content ID is assigned with a Logical Channel Identification (LCID). When an MBS context (within an MCID) is delivered the respective LCID is indicated. Typically, the use of LCIDs and content IDs is vendor specific and depends on the application-layer utilization. When an MS moves from one MBS_ZONE to another and when LCIDs are used, LCID should be re-assigned together with the MCID.

Obviously an MBS_ZONE may include one or more BSs, and a BS may have multiple MBS_ZONE identifiers.

However, one of the drawbacks of the currently known systems is the impact upon the service received by an MS moving from one MBS_ZONE to another, as when the MS detects that it moved to a new MBS_ZONE, it is required to update the MBS Connections IDs ("MCID"s) to match those of the new MBS_ZONE. This updating procedure takes time and while being carried out, it disturbs the reception of all multicast data. Upon entering the new MBS_ZONE, the MCIDs update may be performed either through Location Update ("LU") procedure (e.g. if the MS is currently in Idle-Mode), by initiating Handover ("HO") procedure, or by carrying out a complete network entry.

SUMMARY OF THE INVENTION

It is an object of the present invention to provide a method and apparatus that allow efficient and smooth handover ("HO") process for an MS being a subscriber to MBS.

It is yet another object of the present invention to provide a method and device that enable the MS to retain continuity in the MBS even in cases where the MS that moves from one zone to another is in an idle and/or sleep mode.

It is another object of the present invention to enable efficient MBS by pre-updating multicast connections prior to the transition of the respective MSs to different MBS zones.

Other objects of the invention will become apparent as the description of the invention proceeds.

Thus, in accordance with a first embodiment of the present invention there is provided in a wireless communications network comprising a plurality of MBS zones each comprising at least one Base Station, a method for providing MBS to a mobile terminal capable of moving from one MBS_ZONE to another, the method comprising the steps of:

(i) providing the mobile terminal with one or more multicasting/broadcasting transmissions that comprise at least one MCID associated with an MBS_ZONE other than the current MBS_ZONE at which the mobile terminal is currently receiving these multicasting/broadcasting transmissions;

(ii) retrieving information regarding the at least one MCID, and preferably storing the relevant information at the mobile terminal. More preferably, the information will be retrieved from the currently serving BS and will be associated with MCID belonging to another MBS_ZONE;

(iii) upon detecting that the mobile terminal is capable of receiving transmissions associated with the other MBS zone, utilizing the MCID associated with that other MBS zone to receive multicasting/broadcasting transmissions intended for that mobile terminal.

According to a preferred embodiment of the invention, the one or more multicasting/broadcasting transmissions comprise MCID values associated with each of the MBS zones that are located adjacent to the current MBS_zone.

According to yet another preferred embodiment of the invention, the at least one MCID is associated with one multicasting/broadcasting transmission every pre-defined period of time.

In accordance with still another preferred embodiment of the invention, the at least one MCID is comprised within the MBS_MAP message. In the alternative or in addition, the at least one MCID is comprised within the data transmission as an Extended Sub-Header (ESH) of a MAC PDU. Preferably but not necessarily, the at least one MCID is associated with a neighboring MBS_ZONE.

By still another preferred embodiment of the invention, the step of retrieving information regarding the at least one MCID further comprising retrieving an MBS zone ID associated therewith.

In accordance with yet another preferred embodiment of the invention, the method provided further comprises a step wherein the step of utilizing the MCID associated with that other MBS_ZONE is carried out upon identifying by the mobile terminal that it communicates with a different Base Station which is associated with a different MBS_ZONE for which that MCID is associated (valid).

According to another embodiment of the invention, the mobile terminal is provided with MBS data at the new MBS zone concurrently while carrying out a Location Update ("LU") procedure or Handover ("HO").

In accordance with still another embodiment of the invention, Only BSs located at the MBS zone boundaries include information regarding the at least one MCID in their multicasting/broadcasting transmission.

By yet another embodiment of the invention, the information regarding the at least one MCID provided by the Base Station is associated with MBS_ZONES adjacent to the transmitting BS. In other words, within a specific MBS_ZONE, different Base Stations may include different information regarding the at least one MCID in their respective multicasting/broadcasting transmissions, where that at least one MCID is associated with an MBS_ZONE to which the BS adjacent to the transmitting BS, belongs.

According to another embodiment of the invention, the information regarding the at least one MCID is divided and transmitted in a plurality of transmissions (or frames). By this embodiment, a single transmission will not have to be loaded with all information regarding the various MCIDs and their respective MBS zones pairs that are the neighboring MBS zones of the current MBS zone.

BRIEF DESCRIPTION OF THE DRAWINGS

For a more complete understanding of the present invention, reference is made to the following detailed description taken in conjunction with the accompanying drawings wherein.

DETAILED DESCRIPTION OF PREFERRED EMBODIMENTS

A better understanding of the present invention is obtained when considering the following non-limiting detailed examples taken in conjunction with the drawings.

The method provided by the present invention, enables the provisioning a multicast and broadcast service to a mobile terminal capable of moving from one MBS_ZONE to another irrespective of its operation mode when the move takes place, an operation mode which may be at the time of the change in the MBS_ZONE normal (active) mode, idle mode or even sleep mode, although typically but not necessarily when the MS moves to another MBS_ZONE while being in a sleep mode, its sleep mode will be terminated in order to enable that MS to carry out a handover procedure with the new BS.

The method is based on the idea that when the mobile terminal communicates with a base station which transmits MBS data to the mobile terminal, a base station that belongs to the current MBS zone (i.e. before moving to the new zone), it also provides the mobile terminal with multicast connection identifications (MCIDs), defining connections along which that service can be provided for the mobile terminal in other MBS zones. Preferably, in MBS zones located at the vicinity of the base station and/or of the mobile terminal current location.

Figure 1:
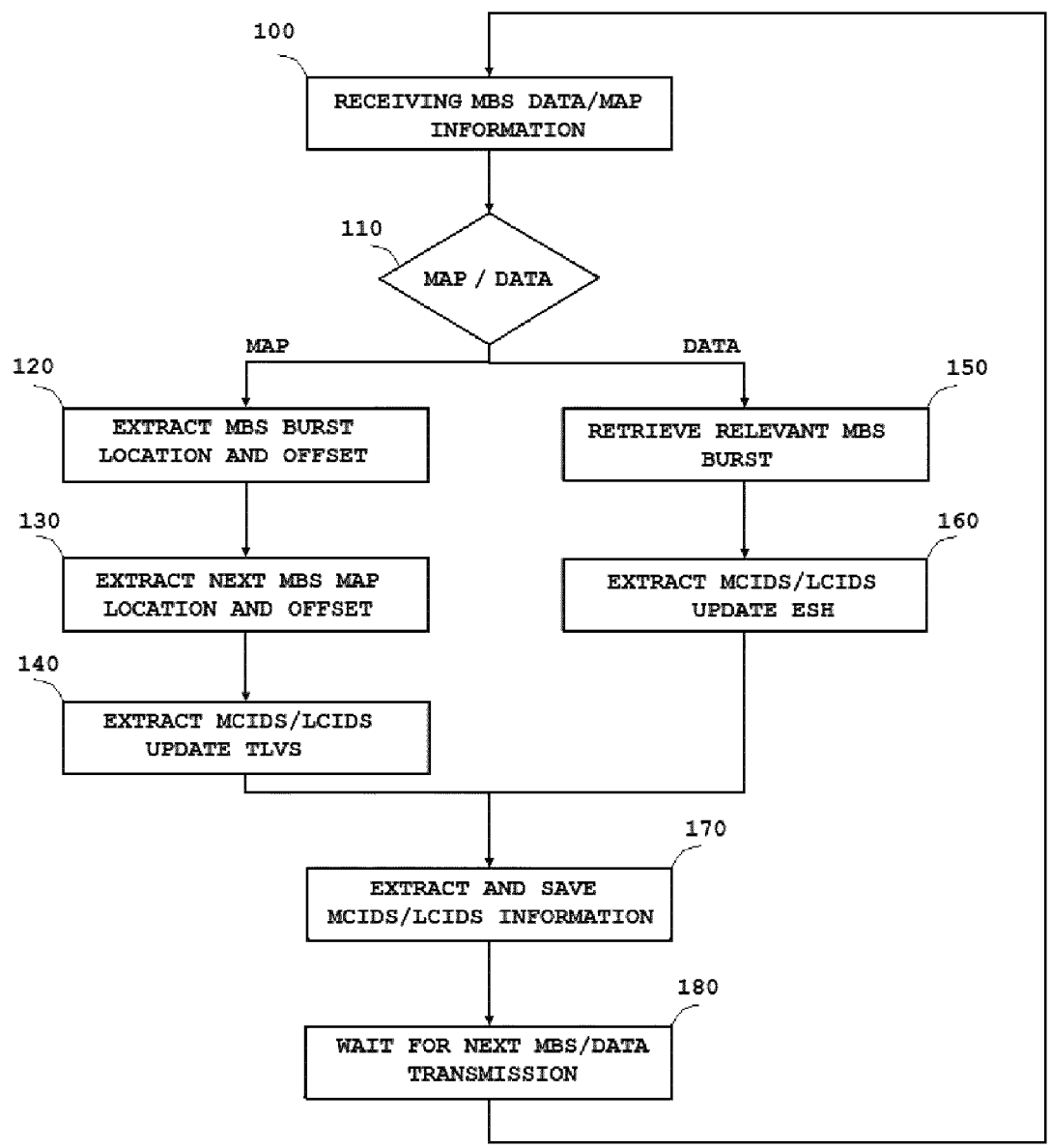
FIG. 1—illustrates a flow chart of a process of an MS receiving MBS data and MAP, and the extraction of MCID/LCID Update information.

Let us consider now FIG. 1 where MBS data or MBS MAP is received at the MS (step 100). The received signal is checked to determine if it comprises MBS data or MBS MAP (step 110). If the signal has been determined to comprise MBS MAP, then the MS retrieves the MBS location and offset (step 120). Next, it extracts the location and offset of the next MBS MAP (step 130), and then it extracts the updated TLV of MCIDs/LCIDs (step 140). If the received signal comprises MBS data, then the MS retrieves the relevant MBS stream (step 150) and then extracts the MCIDs/LCIDs updates from the ESH (step 160). Upon extracting the MCIDs/LCIDs updated information, it is stored at the MS (step 170), and the latter awaits the receipt of the next transmission comprising MAP/data to update the MCID/s/LCIDs accordingly (if necessary).

The MCIDs related information is preferably provided to the mobile terminal as part of the multicast/broadcast transmissions it receives from its serving Base Station. Upon receiving these transmissions, the mobile terminal parses the MCID update information and keeps the relevant MCIDs information thereat. The information transmitted includes parameters associated with MBS_ZONEs, and typically includes pairs of ID of other MBS zone(s) with their corresponding new MCIDs.

The serving base station updates this information preferably on a periodic basis (and not every multicast/broadcast transmission), but as will be appreciated by those skilled in the art, any other update scheme should be understood as being encompassed by the present invention, and the MS keeps the most updated information.

Figure 2:
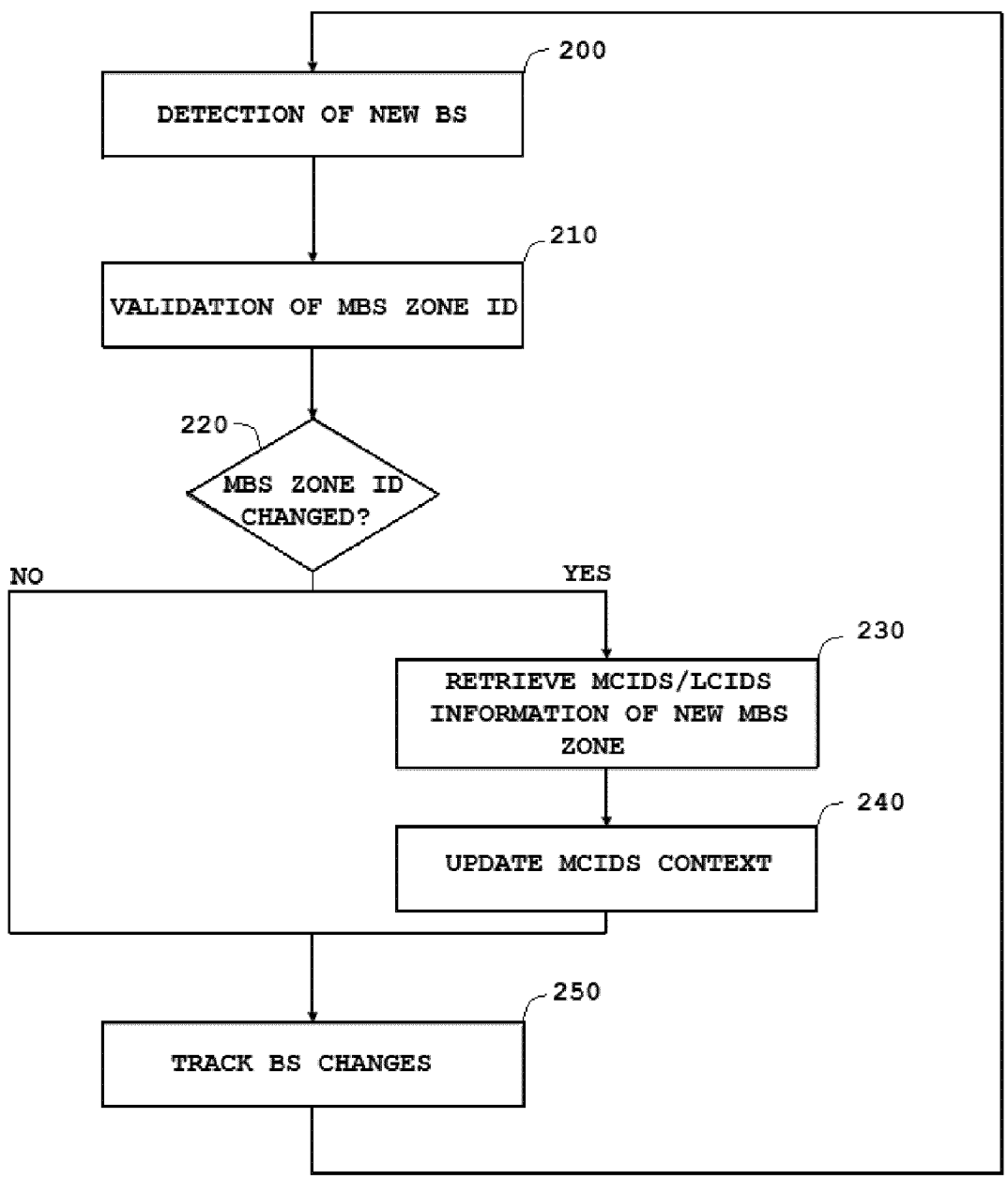
FIG. 2—illustrates an MS Updating Scheme which relates to actions to be taken by the MS when a new BS with new MBS_ZONE ID is detected.

By the process illustrated in FIG. 2, when the MS detects that due to its movement, the MBS_ZONE has been changed, i.e., the BS from which it is due to get the service is part of another MBS_ZONE (step 200), it would first validate the ID of the MBS_ZONE (step 210), and if the MBS_ZONE has been changed (step 220), it will retrieve and the MCIDs/LCIDs related to this new MBS_ZONE (step 230) and change (update) the MCIDs according to the information that is kept at the mobile terminal, without undue delays (step 240). The MS will remain with the updated MCIDs as long as no changes are detected in the serving BS (step 250. If such changes are detected, the process starts again at step 200. Therefore the solution provided by the present invention enables the MS to continue receiving MBS data while concurrently updating its location or registering at the new base station, e.g. while performing a location update procedure, by carrying out a handover procedure, or other applicable type of a registration procedure. As was previously explained, connectivity is maintained while following the method of the present invention regardless of the state of the mobile terminal (MS), even during Idle-Mode and Sleep-Mode. Preferably, the same MCID value is provided for several connections established with different MSs that have been registered to receive the same service, e.g., transmissions associated with a certain TV channel.

Figure 3:
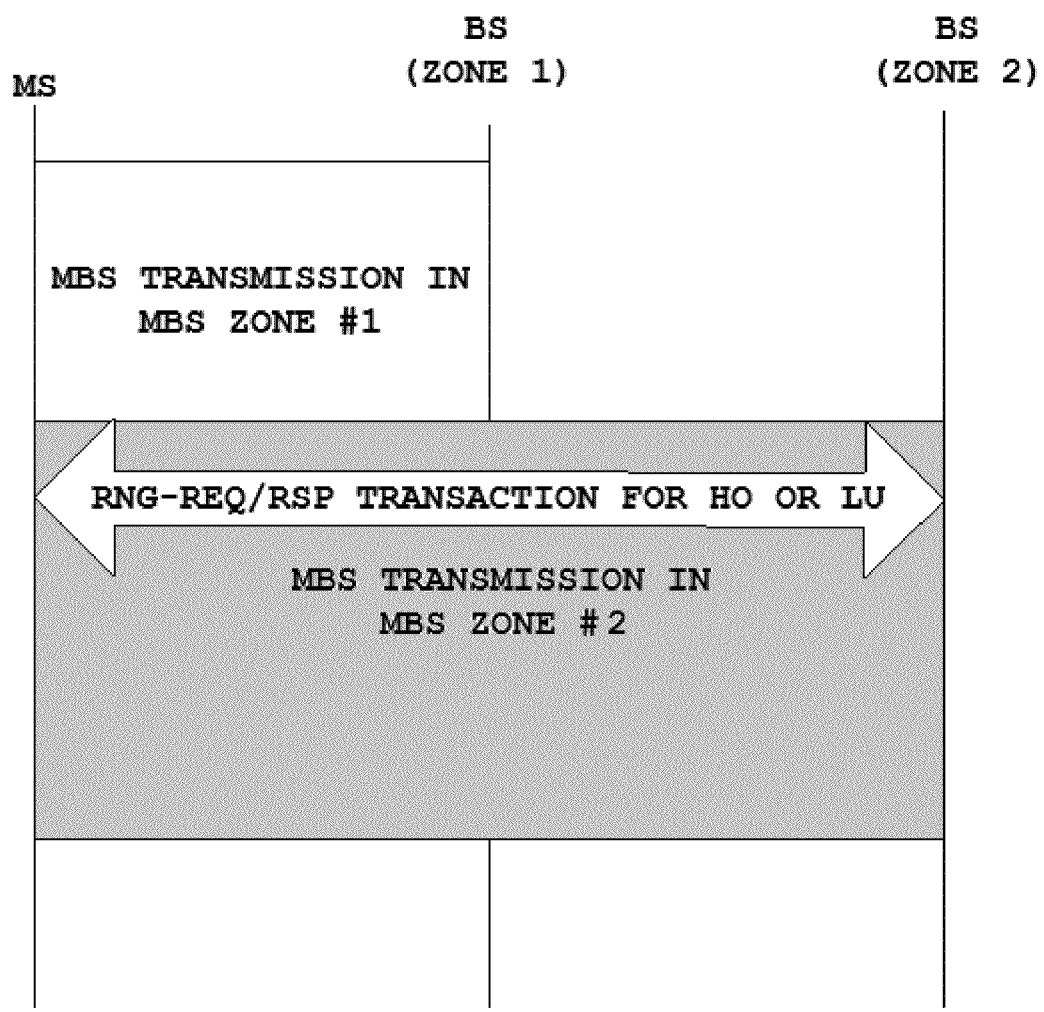
FIG. 3—demonstrates a time flow describing the movement of an MS from one MBS_ZONE to another.

In FIG. 3 a time flow is demonstrated, which relates to the movement of an MS from one MBS_ZONE to another. Once the MS detects that it is about to be serviced by another (new) BS which is associated with a new MBS_ZONE ID, the MS performs:

1. MCIDs/LCIDs updates; and
2. HO/LU procedure.

Preferably, the distribution of MCIDs' updated values associated with neighboring MBS_ZONEs is carried out as part of the multicast/broadcast transmissions. Such updates can be part of the frame map or within the data transmission. In other words, the MCID Update information (TLV) can be part of one of the DL messages, such as MBS_MAP message, and/or an extended sub-headers (ESH) may convey such information as in the TLV, within the MCID PDU.

In each of the following Tables 1, 2 and 3 there is provided a non-limiting example of possible TLVs for conveying MCID updating information via the MBS_MAP message. By the example of Table 1, the current MCID and the new MCID are shown within a certain MBS zone. In the example of Table 2 the current MCID and a 9 bits delta value (i.e. the difference between the current MCID value and a new MCID value within the MCIDs range, required to calculate the new MCID within a certain MBS zone). The example of Table 3 shows the service flow identification ("SFID") and the new multicast connection identification (MCID) within a given MBS zone.

TABLE 1

MCID Update TLV with current and new MCID information.

| Type | Length | Value | Scope |
|---|---|---|---|
| XXX | N × (16 + 16 + 8) = N × 40 bits | N × (Current_MCID, New_MCID, MBS_ZONE_ID) | MBS_MAP |

TABLE 2

MCID Update TLV with current MCID and delta information.

| Type | Length | Value | Scope |
|---|---|---|---|
| XXX | N × (16 + 9 + 8 + 3) = N × 36 bits | N × (Current_MCID, Delta, MBS_ZONE_ID) | MBS_MAP |

TABLE 3

MCID Update TLV with SFID and new MCID information.

| Type | Length | Value | Scope |
|---|---|---|---|
| XXX | N × (32 + 16 + 8) = N × 56 bits | N × (SFID, New_MCID, MBS_ZONE_ID) | MBS_MAP |

Each of the following Tables 4, 5 and 6 illustrates a non-limiting example of conveying MCID updating information via an MBS PDU using an ESH. The example of Table 4 includes the current MCID and the new MCID within a certain MBS zone. Table 5 illustrates the provisioning of the current MCID and the delta value required to calculate the new MCID within a certain MBS zone, while by the example of Table 6, the SFID and the new MCID within a certain MBS zone, are provided.

TABLE 4

MCID Update ESH with current and new MCID information.

| Name | Size (bits) | Description |
|---|---|---|
| Current MCID | 16 | MCID used in the current MBS zone |
| New MCID | 16 | MCID to be used in the MBS zone indicated in the MBS zone ID field |
| MBS zone ID | 8 | A new MBS zone |

TABLE 5

MCID Update ESH with MCID and Delta information.

| Name | Size (bits) | Description |
|---|---|---|
| Current MCID | 16 | MCID used in current MBS zone |
| Delta | 9 | The difference for calculating new MCID from current MCID, for the MBS zone indicated by the MBS zone ID field |
| MBS zone ID | 8 | A new MBS zone |
| Reserved | 3 | |

TABLE 6

MCID Update ESH with SFID and new MCID information.

| Name | Size (bits) | Description |
|---|---|---|
| New MCID | 16 | MCID to be used in the MBS zone indicated by the MBS zone ID field |
| SFID | 32 | The service flow ID |
| MBS zone ID | 8 | A new MBS zone |

MCIDs used for MBS are preferably taken from the range of 0xFEA0-0xFEFE (94 connections). Therefore, MCIDs can also be represented by using 12 bits string. This allows further reduction in the size of TLVs and ESHs exemplified above.

The table below illustrates an LCID update TLV. The assignment of LCID to MBS Content ID is similar to the method provided by the IEEE-802.16e standard during Multicast connection establishment (through DSA transaction) where a 1 byte long LCID is paired with the 2 byte long MBS Content ID.

TABLE 7

LCID update TLV

| Type | Length | Value | Scope |
|---|---|---|---|
| XXX | 8 + 16 + N × 16) = 24 + N × 16 bits | N × (MBS_ZONE_ID, New_MCID, MBS Content ID(0), MBS Content ID(1), . . . MBS Content ID(N − 1)) | MBS_MAP |

TABLE 8 a possible way of combining both MCID update and LCID update.

| Type | Length | Value | Scope |
|---|---|---|---|
| XXX | N × (16 + 16 + 8 + 8 + M × 16) = N × (48 + M × 16) bits | N × (Current_MCID, New_MCID, MBS_ZONE_ID, Number of MBS Contents IDs, MBS Content ID(0), MBS Content ID(1), . . . MBS Content ID(N − 1)) | MBS_MAP |

TABLE 9 a possible update of a single MCID and its LCIDs

| Type | Length | Value | Scope |
|---|---|---|---|
| XXX | 16 + 16 + 8 + N × 16 = 40 + N × 16 bits | Current_MCID, New_MCID, MBS_ZONE_ID, N × (MBS Content ID(0), MBS Content ID(1), . . . MBS Content ID(N − 1)) | MBS_MAP |

As will be appreciated by those skilled in the art, the above description includes only some embodiments of the method for providing smooth transition of mobile terminals between one MBS zone to another without interfering with the multicast service, and serves for its illustration. It should be understood that a number of other ways of carrying out the method provided by the present invention may be devised by a person skilled in the art without departing from the scope of the invention, and are thus encompassed by the present invention.

The present invention has been described using non-limiting preferred embodiments thereof that are provided by way of example and are not intended to limit the scope of the invention. Variations of embodiments described will occur to persons of the art. Furthermore, the terms "comprise", "include", "have" and their conjugates, shall mean, when used in the claims, "including but not necessarily limited to." The scope of the invention is limited only by the following claims.

The invention claimed is:

1. In a wireless communications network comprising a plurality of multicast and broadcast service (MBS) zones each of which comprises at least one base station, a method for receiving a MBS, the method comprising:

receiving the MBS at the mobile terminal operating currently in a first MBS zone;

receiving at the mobile terminal a multicast/broadcast transmission from a base station in the first MBS zone, comprising a multicast connection identification (MCID) associated with a second MBS zone other than the first MBS zone, the MCID defining a connection along which the MBS can be provided for the mobile terminal in the second MBS zone;

storing at the mobile terminal the information regarding the MCID associated with the second MBS zone; and upon detecting that the mobile terminal is capable of receiving the MBS in the second MBS zone, utilizing the stored MCID associated with the second MBS zone to begin receiving the MBS in the second MBS zone before registration of the mobile terminal in the second MBS zone, when the mobile moves from the first MBS zone to the second MBS zone during a handover procedure.

2. A method according to claim 1, wherein the MBS further comprises a respective MCID associated with each of the MBS zones located adjacent to the first MBS zone.

3. A method according to claim 1, wherein only one or more of the base stations associated with the current MBS zone and located at the boundaries thereof, transmit information regarding said at least one MCID.

4. A method according to claim 1, wherein said information regarding the MCID, comprises information relating to at least one MBS zone adjacent to the respective transmitting base station.

5. A method according to claim 1, wherein the MCID is comprised in one MBS every pre-defined period of time.

6. A method according to claim 1, wherein the MCID is comprised within an MBS MAP message.

7. A method according to claim 1, wherein the MCID is comprised within an extended sub-header of a data message.

8. A method according to claim 1, wherein the step of retrieving information regarding the MCID comprises retrieval of an identification of an associated MBS zone.

9. A method according to claim 1, further comprising utilizing the MCID to receive the MBS from a new base station associated with the second MBS zone, upon establishing communication with the new base station.

10. A method according to claim 1, wherein said mobile terminal is provided with MBS data for the second MBS zone concurrently while carrying out a location update procedure.

11. A method according to claim 1, wherein information regarding multiple MCIDs is received over a plurality of frames.

12. A method according to claim 1, wherein information regarding multiple MCIDs is received in one frame.

13. A method according to claim 1, wherein said mobile terminal is provided with MBS data for the second MBS zone while carrying out a handover procedure.

14. A method according to claim 1, further comprising using the information regarding a second MCID or a first MCID based on the current location information.

15. A method according to claim 14, wherein the information regarding the second MCID is received in a map message.

16. A method as claimed in claim 14, wherein the mobile terminal receives the information regarding the second MCID in a map message when in an idle state.

17. A method as claimed in claim 14, wherein the mobile terminal receives the information regarding the second MCID in a map message when in a sleep mode state.

18. A method of operating a mobile terminal which is subscribed to a multicast/broadcast service (MBS), the method comprising:
  in a current MBS zone, receiving an MBS transmission pertaining to the subscribed for MBS, based on a first MBS connection ID (MCID) associated with the current MBS zone;
  retrieving from an MBS transmission received in the first MBS zone, information relating to a second MCID associated with a second MBS zone, the information relating to a second MCID defining a connection along which the MBS transmissions can be received by the mobile terminal in the second MBS zone;
  saving the information regarding the second MCID;
  using the saved information regarding the second MCID when the mobile terminal changes from the first MBS zone to the second MBS zone to begin receiving the MBS before registration of the mobile terminal in the second MBS zone, thereby enabling the mobile terminal to retain continuity in the MBS during the change from the first MBS zone to the second MBS zone.

19. A method according to claim 18, wherein the mobile terminal receives the information regarding the second MCID during a location update procedure that provides the mobile terminal with current location information.

20. A method as claimed in claim 19, further comprising using the information regarding the second MCID or the first MCID based on the current location information.

21. A method as claimed in claim 18, wherein the information regarding the second MCID is received in an extended sub-header of a packet in the MBS transmission.

22. A method as claimed in 18, wherein the information regarding the second MCID is received in a map message.

23. A method as claimed in claim 22, wherein the mobile terminal receives the information regarding the second MCID in the map message when in an idle state.

24. A method as claimed in claim 22, wherein the mobile terminal receives the information regarding the second MCID in the map message when in a sleep mode state.

25. A method as claimed in claim 18, wherein the mobile terminal does not need to register with a base station in the second MBS zone for receiving the MBS transmissions pertaining to the subscribed for MBS.

26. A method as claimed in claim 18, wherein the mobile terminal does not need to perform a network entry procedure for the second MBS zone for receiving the MBS transmissions pertaining to the subscribed for MBS.

* * * * *